June 21, 1949.　　A. T. SCHEIWER　　2,473,973
COUPLING
Filed May 21, 1945

INVENTOR.
BY
Albert T. Scheiwer

Patented June 21, 1949

2,473,973

UNITED STATES PATENT OFFICE 2,473,973

COUPLING

Albert T. Scheiwer, Erie, Pa.

Application May 21, 1945, Serial No. 594,932

6 Claims. (Cl. 285—169)

This invention relates generally to couplings and more particularly to snap-type couplings.

A quickly acting, securely sealed coupling is necessary in such cases as oxygen masks in airplanes. Because of the heavy mittens worn, the connection must be automatic after the male member is inserted into the female member of the coupling. All manual operations must be eliminated.

It is, accordingly, an object of my invention to provide a coupling which has all of the attributes as set forth above and it is more particularly an object of my invention to provide a coupling which is automatic in operation, simple in construction, efficient in operation, economical in cost, and light in weight.

Another object of my invention is to provide a coupling which is securely locked upon mere insertion of the male member into the female member.

Another object of my invention is to provide an efficient snap-type coupling with a minimum of material.

Other objects of my invention will become evident from the following detailed description, taken in conjunction with the accompanying drawings, in which Fig. 1 is a side elevational view with parts broken away of my novel snap-type coupling in a locked position.

Figure 1:
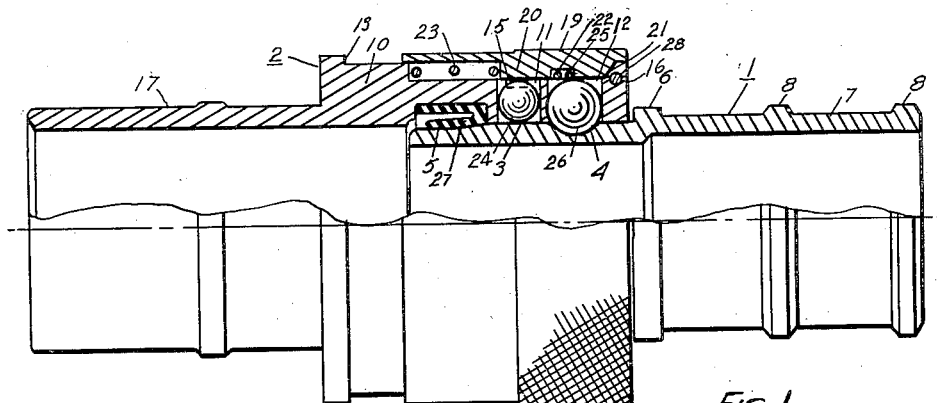

Referring now to the drawings, Figs. 1, 2, 3, and 4 show a male member 1 and a female member 2. The male member 1 comprises a connecting portion 5 with a peripheral groove 4, an end connecting portion 5, a shoulder 6, and a hose connecting portion 7 with raised annular shoulders 8.

The female member 2 comprises an inner sleeve 10 with radially extending ball retaining apertures 11 and 12, a shoulder 13, an inner annular groove 14, a peripheral groove 15, a clip retaining groove 16, and a hose connecting portion 17 with a raised annular shoulder 18, and a movable sleeve 19 surrounding the inner sleeve 10, having a depending portion 20, a camming portion 21, an inner groove 22, and a spring member 23 for urging the sleeve 19 longitudinally of the inner sleeve 10. Ball members 24 are disposed in the apertures 11 to engage a spring member 25 disposed in the inner groove 22 in the movable sleeve 19. Ball members 26 are disposed in the apertures 12 to engage the groove 4 in the connecting portion 3 of the male member 1 to secure the male and female members 1 and 2 together. An annular U-shaped washer 27 is disposed in the groove 14 in the sleeve 10 of the female member 2 to sealingly engage the nose portion 5 of the connecting portion 3 of the male member 1. A clip 28 is disposed in the groove 16 in the sleeve 10 of the female member 2 to engage the camming portion 21 of the sleeve 19.

Figures 2, 3, 6:
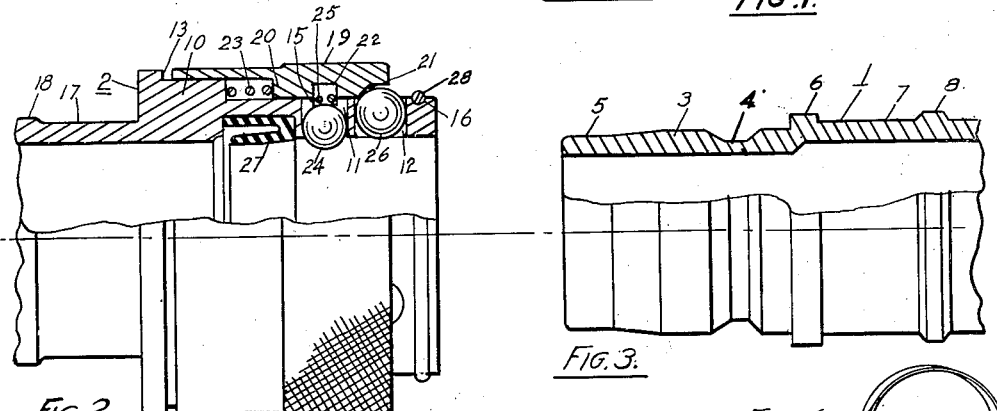
Fig. 2 is a side elevational view with parts broken away of the female member of my novel snap-type coupling in a disconnected position.
Fig. 3 is a side elevational view with parts broken away of the male member of my novel snap-type coupling.
Figs. 6 and 7 show perspective views of different forms of spring members.
Figures 4, 7:
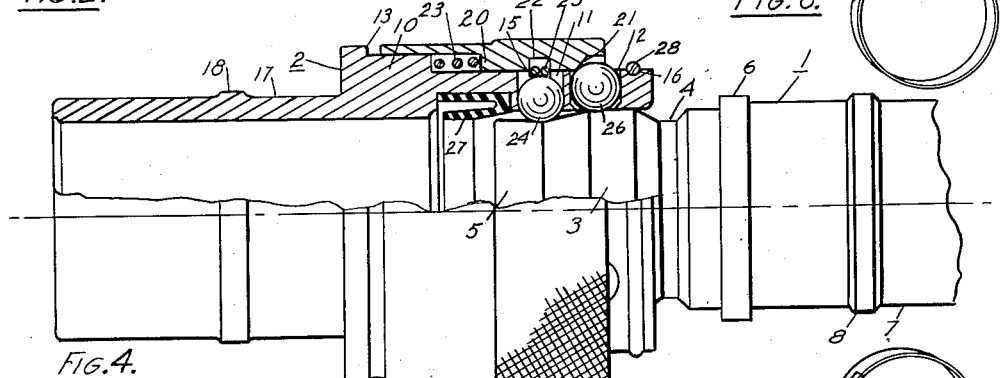
Fig. 4 is a side elevational view with parts broken away of my novel snap-type coupling with the male and female members disconnected.

In operation, the movable sleeve 19 is drawn longitudinally to a position shown in Fig. 2 wherein the spring member 25 drops in the groove 15 in the sleeve 10 of the female member 2 to hold the movable sleeve 19 in the position shown in Fig. 2. The movable sleeve 19 remains in the position shown in Fig. 2 when in a disconnected position. To couple the male and female members 1 and 2 together the connecting portion 3 of the male member 1 is inserted into the female member 2 thereby forcing the ball members outwardly to move the spring member 25 outwardly into the groove 22 in the movable sleeve 19, permitting the movable sleeve 19 to move longitudinally. Upon longitudinal movement of the movable sleeve 19, the camming portion 21 on the movable sleeve 19 forces the ball members 26 into engagement with the groove 4 in the connecting portion 3 of the male member 1, and the male and female members 1 and 2 are connected together as shown in Fig. 1.

To disconnect the male and female member 1 and 2, the movable sleeve 19 is moved longitudinally to free the ball members 26 in engagement with the groove 4 in the connecting portion 3 of the male member 1, thereby freeing the male member 1 and permitting its removal. The ball members 24 then move downwardly in the apertures 11 permitting the spring member 25 to move into the groove 15 in the sleeve 10 and hold the movable sleeve 19 in the position shown in Fig. 2 ready for a quick connection when the connecting portion 3 of the male member 1 is inserted into the female member 2.

It will be evident that any form of spring or spring urged member may be carried by the movable sleeve to engage the ball members 24. Springs 90 and 91 shown in Figs. 6 and 7 may be utilized to engage the ball members 24.

Figure 5:
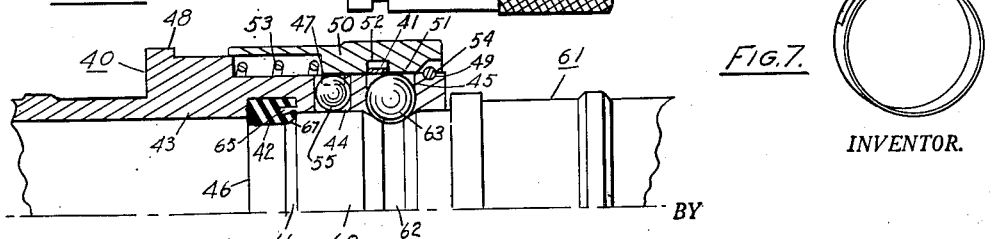
Fig. 5 is a side elevational view with parts broken away of a modified form of my novel coupling in a locked position.

Fig. 5 shows a female member 40 similar to the female member 2 shown in Fig. 1 except that a different type spring member 41 and a different type washer 42 is utilized. The female member 40 comprises a sleeve 43 having apertures 44 and 45, an inner groove 46, an outer groove 47, a shoulder 48, and a clip retaining groove 49. The movable member 50 has a depending camming portion 51, an inner groove 52, and a spring 53 for urging the movable member 50 towards a stop clip 54 disposed in the clip groove 49 in the sleeve 43. Ball members 55 disposed in apertures 44 engage the spring member 41 in the groove 52 of the movable member 50 to free the movable member 50 when a connecting portion 60 of a male member 61 with a groove 62 is inserted into the female member 2. Ball members 63 are disposed in the apertures 45 to engage the groove 62 in the connecting portion 60 of the male member 61 to secure the male and female members 40 and 61 together. The washer 42 has a groove adapted to engage a reduced nose portion 66 of the connecting portion 60 of the male member 61. A portion 67 of the washer 42 adjacent the groove 42 thereof is forced into an arcuate position as shown in Fig. 5 to securely seal the male and female members 40 and 61 when they are connected together.

The operation of the coupling shown in Fig. 5 is the same as the coupling shown in Fig. 1 and described heretofore.

It will be seen from the foregoing that I have provided a simple and efficient coupling which may be coupled by merely inserting the male member into the female member and efficient means for holding the movable sleeve of a female member in a ball-type coupling to permit automatic coupling when the male member is inserted.

Various changes may be made in the specific embodiment of the present invention without departing from the spirit thereof, or from the scope of the appended claims.

What I claim is:

1. A coupling comprising a male member having a connecting portion with a groove, and a female member comprising a sleeve having cam retaining apertures and a groove, camming members carried by apertures in said sleeve for engaging said groove in the connecting portion of said male member to secure said male and female members together, a movable sleeve surrounding said sleeve having a groove, for locking said camming members in engagement with the groove in said male member, and a spring member disposed in the groove in said movable member adapted to engage the groove in said sleeve of said female member to lock said movable sleeve in a position to free said locking camming members and camming members in apertures of said sleeve of said female member adapted to move said spring member out of its engaging groove in said sleeve of said female member when the connecting portion of said male member is inserted into said female member.

2. A coupling as set forth in claim 1 wherein said camming members are ball members.

3. A coupling comprising a male member having a connecting portion with a groove; a female member comprising a sleeve having an outer groove, locking ball members carried by said sleeve to engage the groove in said connecting portion of said male member to lock said male and female members together, a spring-urged movable sleeve having an inner groove for locking said locking ball members in engagement with the groove in the connecting portion of said male member, a spring member disposed in the groove of said movable member adapted to engage the outer groove on said sleeve to hold said movable sleeve out of engagement with said locking ball members, and a second set of ball members carried by said sleeve of said female member to move said spring member in the groove of said movable sleeve out of engagement with the groove of said sleeve of said female member to free said movable member when said male member is inserted into said female member.

4. A coupling comprising a male member having a connecting portion with a groove; and a female member comprising an inner sleeve with an outer groove, locking camming members carried by said inner sleeve to engage the groove in the connecting portion of said male member to secure said male and female members together, a movable sleeve for locking said camming members in engagement with the groove in the connecting portion of said male member, means carried by said movable member to engage the groove in said sleeve to hold said movable sleeve out of engagement with said locking camming members, and camming members carried by said inner sleeve adapted to engage said means for holding said movable sleeve to free said movable sleeve when the connecting portion of said male member is inserted into the sleeve of said female member.

5. A coupling as set forth in claim 4 wherein said camming members are ball members.

6. A coupling as set forth in claim 4 wherein said female member has a washer disposed therein having a longitudinally extending groove whereby a lateral portion of said washer adjacent said groove is moved to an angular position upon engagement by the connecting portion of said male member.

ALBERT T. SCHEIWER.

REFERENCES CITED

The following references are of record in the file of this patent:

UNITED STATES PATENTS

| Number | Name | Date |
| --- | --- | --- |
| 1,460,154 | Frazier | June 26, 1923 |
| 2,135,221 | Scheiwer | Nov. 1, 1938 |
| 2,279,146 | Schneller | Apr. 7, 1942 |